(12) United States Patent
Kano

(10) Patent No.: US 9,919,383 B2
(45) Date of Patent: Mar. 20, 2018

(54) LASER MACHINING METHOD AND LASER MACHINING APPARATUS

(71) Applicant: Mitsubishi Electric Corporation, Tokyo (JP)

(72) Inventor: Junji Kano, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 0 days.

(21) Appl. No.: 15/515,464

(22) PCT Filed: Oct. 17, 2014

(86) PCT No.: PCT/JP2014/077753
§ 371 (c)(1),
(2) Date: Mar. 29, 2017

(87) PCT Pub. No.: WO2016/059730
PCT Pub. Date: Apr. 21, 2016

(65) Prior Publication Data
US 2017/0232558 A1 Aug. 17, 2017

(51) Int. Cl.
*B23K 26/38* (2014.01)
*B23K 26/00* (2014.01)
(Continued)

(52) U.S. Cl.
CPC ............ *B23K 26/38* (2013.01); *B23K 26/006* (2013.01); *B23K 26/042* (2015.10);
(Continued)

(58) Field of Classification Search
CPC .... B23K 26/38; B23K 26/042; B23K 26/006; B23K 26/0665; B23K 26/064; B23K 26/14; B23K 26/382
(Continued)

(56) References Cited

U.S. PATENT DOCUMENTS 5,770,833 A    6/1998  Kanaoka et al.
9,248,524 B2   2/2016  Kurosawa et al.
(Continued)

FOREIGN PATENT DOCUMENTS

DE    10 2012 014 323 A1    1/2013
DE    10 2013 210 857 B3    8/2014
(Continued)

OTHER PUBLICATIONS

International Search Report for PCT/JP2014/077753 dated Jan. 13, 2015 [PCT/ISA/210].
(Continued)

*Primary Examiner* — Eric Stapleton
(74) *Attorney, Agent, or Firm* — Sughrue Mion, PLLC; Richard C. Turner

(57) ABSTRACT

A laser machining method includes a first piercing process of forming a non-through piercing hole extending from a top surface to a central portion of a workpiece; a workpiece cooling process; a second piercing process of making the piercing hole pierce to a bottom surface of the workpiece; and a workpiece cutting process. The second piercing process includes performing piercing by irradiating the workpiece with a laser beam while changing the output of the laser beam from a second output value to a third output value, which is smaller than the first output value and larger than the second output value, the focal position from a first in-focus position to a second in-focus position having a larger in-focus amount than the first in-focus position, and the depth of focus from a second depth deeper than a first depth to a third depth deeper than the second depth.

11 Claims, 11 Drawing Sheets

(51) Int. Cl.
    *B23K 26/042*     (2014.01)
    *B23K 26/06*     (2014.01)
    *B23K 26/064*     (2014.01)
    *B23K 26/14*     (2014.01)
    *B23K 26/382*     (2014.01)

(52) U.S. Cl.
    CPC ........ *B23K 26/064* (2015.10); *B23K 26/0665* (2013.01); *B23K 26/14* (2013.01); *B23K 26/382* (2015.10)

(58) Field of Classification Search
    USPC ..................................................... 219/121.72
    See application file for complete search history.

(56) References Cited

U.S. PATENT DOCUMENTS

| | | |
|---|---|---|
| 2007/0000875 A1 | 1/2007 | Scaggs |
| 2013/0026144 A1 | 1/2013 | Kurosawa et al. |
| 2016/0096239 A1 | 4/2016 | Raichle |

FOREIGN PATENT DOCUMENTS

| | | |
|---|---|---|
| JP | 05-057469 A | 3/1993 |
| JP | 07-185854 A | 7/1995 |
| JP | 08-039273 A | 2/1996 |
| JP | 09-206975 A | 8/1997 |
| JP | 11-047964 A | 2/1999 |
| JP | 2000-237886 A | 9/2000 |
| JP | 2001-038482 A | 2/2001 |
| JP | 2001-038485 A | 2/2001 |
| JP | 2007-075876 A | 3/2007 |
| JP | 2007-075878 A | 3/2007 |
| JP | 2009-136886 A | 6/2009 |
| JP | 2012-000678 A | 1/2012 |
| JP | 2013-027907 A | 2/2013 |
| JP | 2013-208631 A | 10/2013 |

OTHER PUBLICATIONS

Written Opinion for PCT/JP2014/077753 dated Jan. 13, 2015 [PCT/ISA/237].
Communication dated Sep. 8, 2017, issued by the German Patent Office in counterpart German Application No. 112014006885.3.
Communication dated Dec. 4, 2017, issued by the State Intellectual Property Office of People's Republic of China in counterpart Chinese Application No. 201480082004.7.

LASER MACHINING METHOD AND LASER MACHINING APPARATUS

CROSS REFERENCE TO RELATED APPLICATIONS

This application is a National Stage of International Application No. PCT/JP2014/077753 filed Oct. 17, 2014, the contents of all of which are incorporated herein by reference in their entirety.

FIELD

The present invention relates to a laser machining method and a laser machining apparatus with which piercing is performed.

BACKGROUND

When a workpiece is cut by laser machining, it is conventional to use a method of forming a through hole at a cutting start point on the workpiece prior to starting the cutting. The through hole is called a piercing hole, which is formed by machining called piercing.

Patent Literature 1 discloses a laser machining method that inhibits the oxidation/combustion reaction during piercing, reduces the amount of molten metal scattering, and forms the piercing hole in a short period of time by performing piercing that includes a first process of irradiating a workpiece with a beam under a first condition, a second process of suspending irradiation with the beam, and a third process of re-irradiating the workpiece with the beam under a second condition.

CITATION LIST

Patent Literature

Patent Literature 1: Japanese Patent Application Laid-Open No. 2007-75878

SUMMARY

Technical Problem

However, the laser machining method disclosed in Patent Literature 1 above does not disclose a method of inhibiting self-burning at the time of irradiation with the beam in the first process and the third process. This means that the output of the beam being emitted has an upper limit and therefore the effect of reducing the time required for piercing is limited under the present circumstances.

Moreover, in the third process of the laser machining method disclosed in Patent Literature 1, it becomes difficult to discharge the molten metal during piercing and at the same time the height of the machining point of piercing changes over time. The third process thus has a lower piercing efficiency than the first process and requires a longer machining time, but the laser machining method disclosed in Patent Literature 1 does not provide a solution to such problems.

The present invention has been made in view of the above, and an object of the present invention is to provide a laser machining method and a laser machining apparatus with which self-burning during irradiation with a beam can be inhibited and the time required for piercing can be reduced.

Solution to Problem

In order to solve the above problems and achieve the object, an aspect of the present invention is a laser machining method of forming a piercing hole by irradiating a workpiece with a laser beam and cutting the workpiece starting from the piercing hole, which is a machining start point, including: a first piercing process of forming the piercing hole that is a non-through hole extending from a top surface to a central portion of the workpiece; a cooling process of cooling the workpiece; a second piercing process of making the piercing hole pierce through to a bottom surface of the workpiece; and a cutting process of cutting the workpiece. The first piercing process includes performing piercing by irradiating the workpiece with the laser beam while setting an output of the laser beam at a first output value, setting a focal position of the laser beam at a defocus position, setting a depth of focus of the laser beam at a first depth, and setting a side gas blow pressure, which is a pressure of a side gas fed to a machining point, at a first pressure value, the cooling process includes stopping the laser beam, maintaining the side gas blow pressure at the first pressure value, and cooling the workpiece, and the second piercing process includes performing piercing by irradiating the workpiece with the laser beam while changing the output of the laser beam to a third output value, which is smaller than the first output value and larger than a second output value, changing the focal position to a second in-focus position, which has a larger in-focus amount than a first in-focus position, and changing the depth of focus to a third depth, which is deeper than a second depth, from a state in which the output of the laser beam is set at the second output value, which is smaller than the first output value, in which the focal position is set at the first in-focus position, in which the depth of focus is set at the second depth, which is deeper than the first depth, and in which the side gas blow pressure is set at a second pressure value, which is lower than the first pressure value.

Advantageous Effects of Invention

The laser machining method and the laser machining apparatus according to the present invention have an effect of inhibiting self-burning during irradiation with the beam and reducing the time required for piercing.

DESCRIPTION OF EMBODIMENTS

A laser machining method and a laser machining apparatus according to embodiments of the present invention will now be described in detail with reference to the drawings. Note that the present invention is not limited to the embodiments.

First Embodiment

Figure 1:
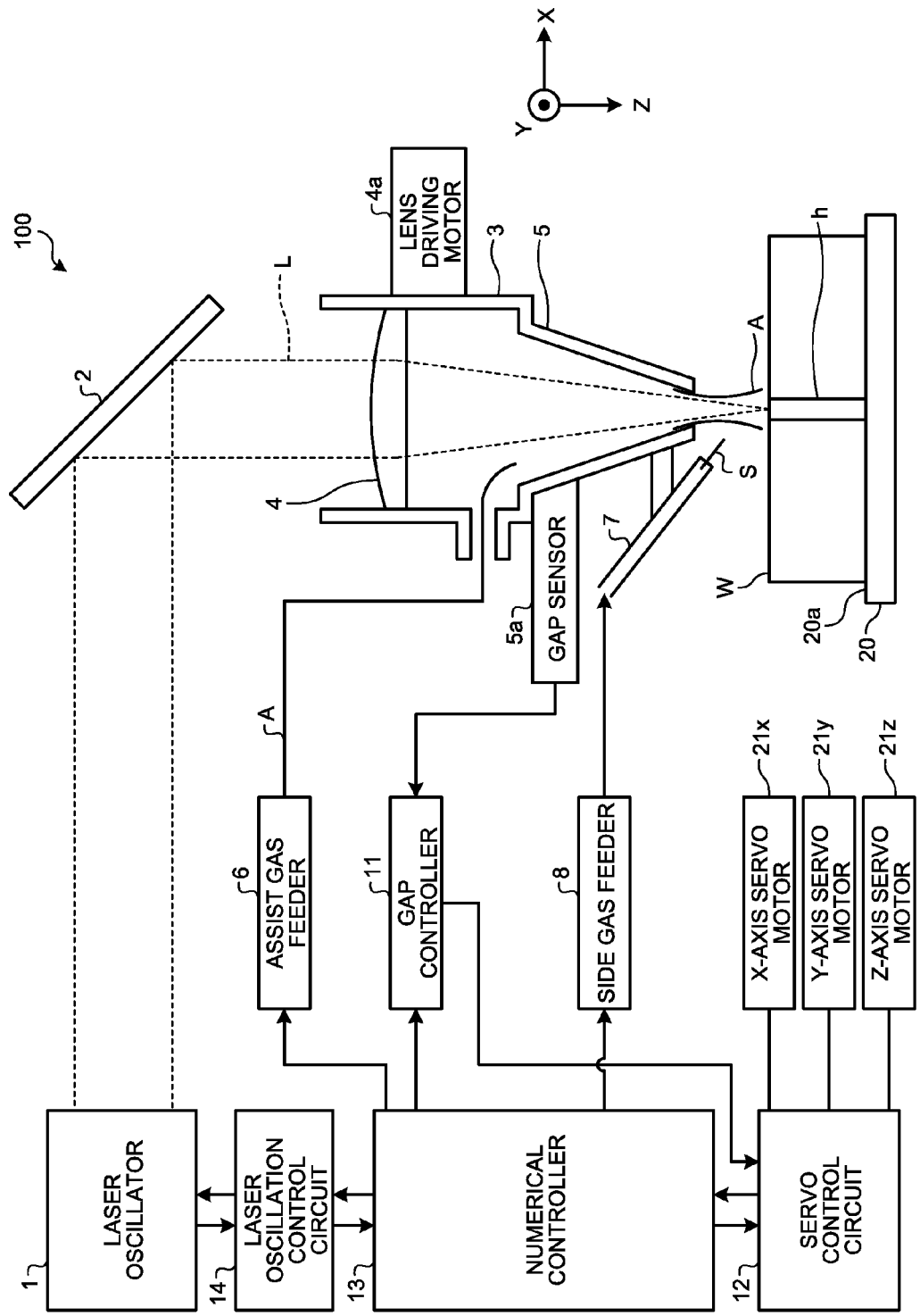
FIG. 1 is a device configuration diagram illustrating a laser machining apparatus that implements a laser machining method according to a first embodiment of the present invention.

FIG. 1 is a device configuration diagram illustrating a laser machining apparatus that implements a laser machining method according to a first embodiment of the present invention. A laser machining apparatus 100 is an apparatus that forms a piercing hole h by irradiating a workpiece W with a laser beam L and then cuts the workpiece W starting from the piercing hole h, which is the machining start point. The laser machining apparatus 100 includes a laser oscillator 1 that oscillates the laser beam L; a curvature variable optical component 2 that changes the depth of focus of the laser beam L by changing the beam diameter of the laser beam L entering from the laser oscillator 1; a machining head 3 that irradiates the workpiece W with the laser beam L and jets out an assist gas A; an assist gas feeder 6 that feeds the assist gas A to the machining head 3; a side gas nozzle 7 that jets out a side gas S toward a machining point of the workpiece W; a side gas feeder 8 that feeds the side gas S to the side gas nozzle 7 and can change the side gas blow pressure, which is the pressure of the side gas S jetting out from the side gas nozzle 7 to the machining point of the workpiece W; a gap controller 11 that controls the gap between the machining head 3 and the workpiece W; a servo control circuit 12 that controls a servo motor for each of the X, Y, and Z axes; a numerical controller 13 that is a controller that executes a numerical control program to control the output of the laser beam L, the depth of focus of the laser beam L, the focal position of the laser beam L, the machining head height, which is the height from the workpiece W to the machining head 3, and the side gas blow pressure, which is the pressure of the side gas S fed to the machining point; and a laser oscillation control circuit 14 that controls the laser oscillator 1. Note that the curvature variable optical component 2 can, for example, be a deformable mirror. The depth of focus indicates a range within which a spot diameter formed by condensing a laser light is considered to be optically the same, and is a range up to a diameter that is the product of $2\sqrt{2}$ and the spot radius according to a definition called the "Rayleigh range".

The machining head 3 includes a lens 4 that condenses the laser beam L entering from the curvature variable optical component 2; a lens driving motor 4a that moves the lens 4 in an optical axis direction; and a nozzle 5 to which the laser beam L exiting the lens 4 is output and which jets out the assist gas A fed from the assist gas feeder 6 to the machining point of the workpiece W. The nozzle 5 is provided with a gap sensor 5a that detects the distance between the nozzle 5 and the workpiece W. The lens 4 is provided inside the machining head 3 and changes the focal position of the laser beam L exiting the curvature variable optical component 2 independently of the machining head height.

The laser beam L exiting the laser oscillator 1 is directed to a predetermined optical path by the curvature variable optical component 2 and enters the machining head 3. The lens 4, which condenses the laser beam L, is provided inside the machining head 3. The laser beam L is condensed by the lens 4 and emitted toward the workpiece W by the nozzle 5 provided at the tip of the machining head 3. Note that the laser beam L exiting the laser oscillator 1 may instead be transmitted by an optical fiber. In this case, an optical component capable of changing the depth of focus of transmitted light is used as the curvature variable optical component 2.

The increase and decrease as well as on/off switching of the output of the laser oscillator 1 are controlled by the laser oscillation control circuit 14 on the basis of a command value from the numerical controller 13 to which a machining program is input. The workpiece W is mounted on a mount surface 20a of a machining table 20 and machined according to the machining program while the machining table 20 and the machining head 3 are moved relative to each other in an X-axis direction, a Y-axis direction, and a Z-axis direction by an X-axis servo motor 21x, a Y-axis servo motor 21y, and a Z-axis servo motor 21z, which are driving sources. Note that while the machining head 3 is moved by the X-axis servo motor 21x, the Y-axis servo motor 21y and the Z-axis servo motor 21z in the following description, the machining table 20 or both the machining head 3 and the machining table 20 may be moved instead. Each of the X-axis servo motor 21x, the Y-axis servo motor 21y, and the Z-axis servo motor 21z is controlled by the servo control circuit 12 on the basis of a command value from the numerical controller 13 to which the machining program is input. Note that the Z-axis direction is a direction perpendicular to the mount surface 20a of the machining table 20, and each of the X-axis direction and the Y-axis direction is a direction parallel to the mount surface 20a of the machining table 20.

Moreover, information detected by the gap sensor 5a is transmitted to the gap controller 11, which compares the measured value with the command value from the numerical controller 13, transmits a correction command to the servo control circuit 12, and controls the distance between the machining head 3 and the workpiece W such that it always matches the command value. Note that the gap sensor 5a may be provided separately from the nozzle 5.

The command value from the numerical controller 13 causes the assist gas feeder 6 to feed the assist gas A into the machining head 3. The assist gas A being fed jets out from the tip of the nozzle 5 coaxially with the laser beam L to be used to accelerate the melting of the workpiece W and to remove molten metal.

The command value from the numerical controller 13 causes the side gas feeder 8 to feed the side gas S to the side gas nozzle 7. Air is an example of the side gas S. The side gas S being fed jets out from the side gas nozzle 7 to the vicinity of the piercing hole h on the workpiece W to be used to remove and cool spatter around the piercing hole h as well as to control the concentration of oxygen. The side gas nozzle 7 is fixed to the machining head 3 and moves up and down with the machining head 3.

The laser machining apparatus 100 according to the first embodiment performs piercing in three processes: a first piercing process of forming a non-through piercing hole h from the top surface of the workpiece W to the central portion thereof; a cooling process of cooling the workpiece W; and a second piercing process of making the piercing hole h pierce through to the bottom surface of the workpiece W. Further, the laser machining apparatus 100 according to the first embodiment performs the second piercing process in two processes. Therefore, the laser machining apparatus 100 according to the first embodiment performs piercing in four processes.

Figure 2:
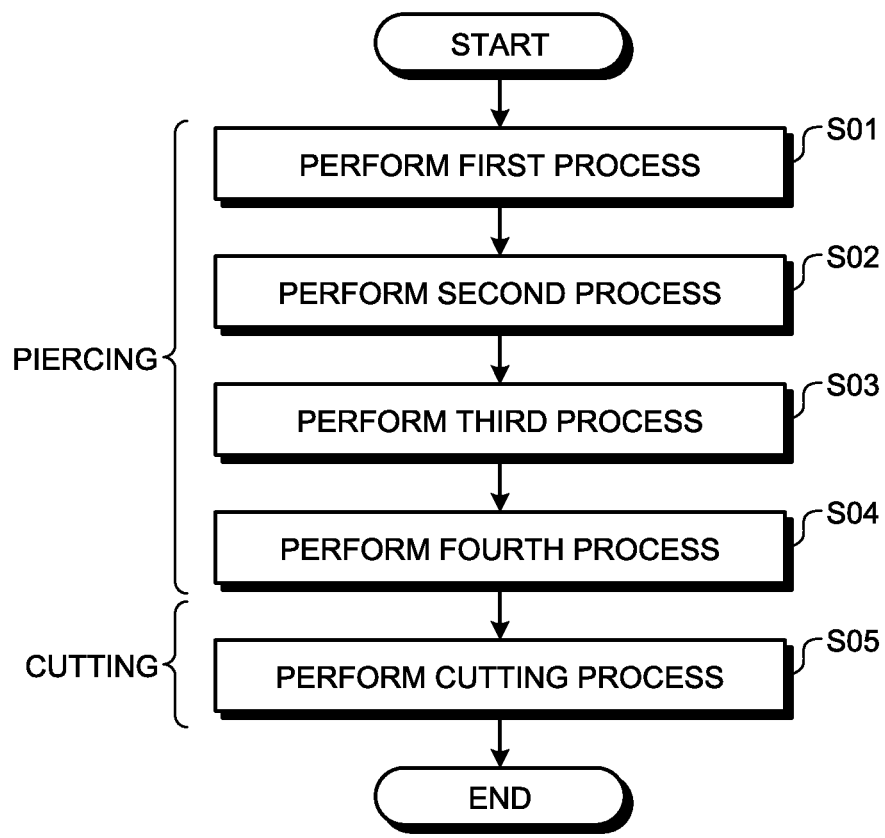
FIG. 2 is a flowchart illustrating the flow of an operation of the laser machining apparatus according to the first embodiment.

FIG. 2 is a flowchart illustrating the flow of an operation of the laser machining apparatus according to the first embodiment for performing piercing and cutting. The laser machining apparatus 100 according to the first embodiment performs piercing to form the piercing hole h in the workpiece W starting from a first process in step S01 and continuing to a fourth process in step S04. Then, in a cutting process in step S05, it performs cutting by irradiating the workpiece W with the laser beam L under a predetermined cutting condition.

In the first embodiment, the machining parameter is controlled in every process to inhibit self-burning and increase piercing efficiency. The machining parameter in this case includes the laser output, the beam profile, the machining head height, and the side gas blow pressure. The beam profile includes the focal position and the depth of focus.

First, an overview of each of the four processes of piercing will be described.

The first process is the first piercing process of piercing an upper side of the workpiece W. In the first process, the workpiece W is irradiated with the high power laser beam L for the purpose of performing piercing down to the central portion of the workpiece W in a short period of time. In the first process, the side gas nozzle 7 jets out a large flow of the side gas S in order to inhibit the occurrence of self-burning caused by the high power laser beam L; therefore, discharge of the high-temperature spatter from the piercing hole h is accelerated while at the same time reducing oxygen purity at the machining point. Note that the flow of the side gas S jetting out of the side gas nozzle 7 is indirectly controlled by the side gas feeder 8 changing the pressure of the side gas S fed to the side gas nozzle 7, where the flow increases as the side nozzle blow pressure increases. The spatter is metal melted by laser machining. In the first process, a large hole is formed by irradiation with a beam having a large spot diameter in order to facilitate discharge of the spatter in and after the present process and the third process to be described. That is, the beam diameter of the laser beam L entering the lens 4 is reduced by the curvature variable optical component 2 to reduce the depth of focus while at the same time the machining head 3 is arranged at a first machining head height by the Z-axis servo motor 21z. Moreover, in the first process, the lens driving motor 4a moves the lens 4 along the optical axis to set the focal position at a defocus position.

Note that the defocus position corresponds to a state in which the focal point is set at a position closer to a light source relative to the machined surface. An in-focus position corresponds to a state in which the focal point is set at a position farther from the light source relative to the machined surface. A just-focus position corresponds to a state in which the focal point is positioned on the machined surface. The distance between the focal point at the defocus position and the just-focus position is called a defocus amount. The distance between the focal point at the in-focus position and the just-focus position is called an in-focus amount.

The second process is the cooling process. In the second process, which is a preparation process for the second piercing process, the irradiation with the laser beam L is suspended in order to interrupt the oxidation reaction. After the first process, the spatter is accumulated in some parts of the interior of the piercing hole h; therefore, the high-temperature spatter is discharged by jetting out a large flow of the side gas S. Moreover, the piercing hole h that is hot and partially melted is solidified by natural cooling realized by cooling with the large flow of the side gas S as well as thermal diffusion of the base metal.

The third process is the first half of the second piercing process to pierce the central portion of the workpiece W. In the third process, the piercing suspended in the second process is resumed. In the third process, the depth of focus is set deeper than that of the first process while at the same time the focal position is set at the in-focus position in order to efficiently irradiate the interior of the piercing hole h formed in the first process with the laser beam L. Moreover, the pulse-wave laser beam L is used in the third process. The pulse-wave laser beam L is set to have low average output and high peak output so as to be able to realize piercing with high efficiency and to inhibit self-burning caused by excessive heat absorbed by the workpiece W. Moreover, the pulse-wave laser beam L in the third process accelerates discharge of the spatter from the piercing hole h and further increases piercing efficiency. In the third process, in order to inhibit an increase in the temperature of the material and prevent the spatter from accumulating in the vicinity of the piercing hole h while ensuring the supply of the assist gas A to the machining point, the side gas S jets out toward the machining point with a lower flow than during the first and second processes.

Note that while the machining point can be irradiated with the beam more efficiently as the depth of focus is deeper, the piercing efficiency is reduced in the fourth process, which is to be described, when the piercing hole h becomes too small in the third process. Accordingly, in the third process, the depth of focus is set between the depth of focus in the first process and the depth of focus in the fourth process, which is to be described.

The fourth process is the second half of the second piercing process to pierce the bottom of the workpiece W. In the fourth process, the depth of focus and the in-focus amount are set deeper/larger than that of the third process in order to efficiently irradiate, with the laser beam L, the bottom of the workpiece W inside the piercing hole h machined in the first to third processes. As with the third process, the laser beam L used in the fourth process is the beam generated by the pulse wave having a high peak. In the fourth process, a position deeper in the piercing hole h than that in the third process is irradiated with the laser beam L, whereby average output of the laser beam L is higher than that of the third process. In the fourth process, as with the third process, in order to inhibit an increase in the temperature of the workpiece W and prevent the spatter from accumulating in the vicinity of the piercing hole h while ensuring the supply of the assist gas A to the machining point, the side gas S jets out toward the machining point with a lower flow than during the first and second processes.

Figure 3:
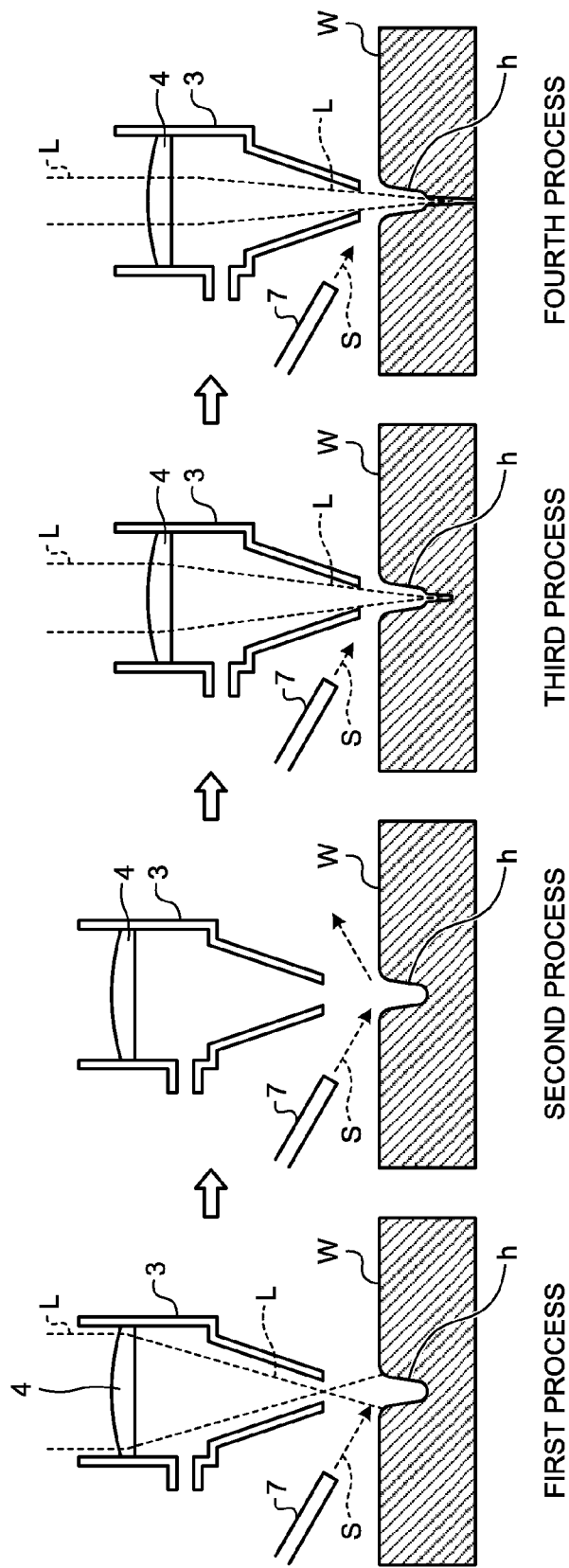
FIG. 3 is a diagram illustrating a change in the position of a machining head and a laser profile during piercing performed by the laser machining apparatus according to the first embodiment.
Figure 4:
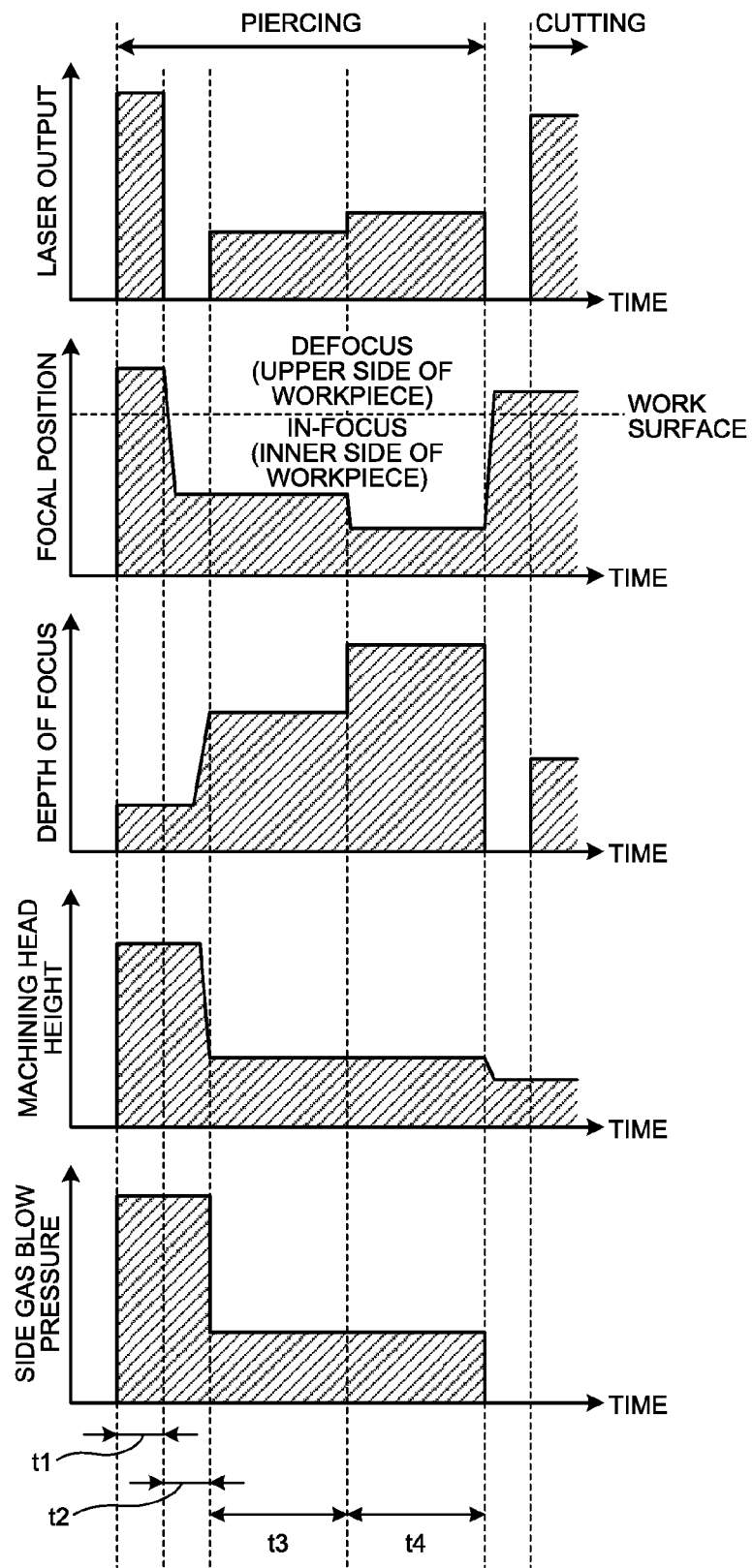
FIG. 4 is a diagram illustrating a change in a machining parameter during piercing performed by the laser machining apparatus according to the first embodiment.

FIG. 3 is a diagram illustrating a change in the position of the machining head and the laser profile during piercing performed by the laser machining apparatus according to the first embodiment. FIG. 4 is a diagram illustrating a change in the machining parameter during piercing performed by the laser machining apparatus according to the first embodiment. The four processes will be described in detail with reference to FIGS. 3 and 4. Note that in FIG. 4, the first process, the second process, the third process, and the fourth process are denoted as t1, t2, t3, and t4, respectively.

The first process will be described first. The first process targets the upper side of the workpiece W, which is machined with less difficulty, and performs piercing down to the central portion of the workpiece W in one go in a short period of time. In the first process, a hole having a diameter larger than that of the piercing hole h formed in and after the third process is formed in order to increase the piercing efficiency in and after the third process.

In the first process, the numerical controller 13 sends a command to the laser oscillation control circuit 14 and causes the laser oscillator 1 to oscillate at a first output value. The first output value is the maximum output value, for example. Note, however, that the first output value is not limited to the maximum output value. The numerical controller 13 further controls the curvature variable optical component 2 to control the beam diameter of the laser beam L entering the lens 4 in the machining head 3 and set the depth of focus at a first depth. The numerical controller 13 sends a command to the servo control circuit 12 to move the machining head 3 and set the machining head height at a first height. The numerical controller 13 sends a command to the lens driving motor 4a to move the lens 4 along the optical axis and set the focal position at the defocus position.

The numerical controller 13 sends a command to the side gas feeder 8 and controls the side gas blow pressure of the side gas S jetting out from the side gas nozzle 7 such that it is at a first pressure value determined according to the output of the laser beam L, thereby causing the high-pressure side gas S inhibiting self-burning caused by the high power beam to be jetted out to the machining point, discharging the high-temperature spatter instantaneously, and reducing the oxygen purity at the machining point. The piercing efficiency in the first process can be increased to the maximum by setting the first output value to the maximum output of the laser oscillator, whereby the side gas blow pressure is set to the pressure corresponding to the maximum output. Note that when the side gas blow pressure is too high in comparison to the output of the laser beam L, the supply of oxygen to the machining point is impeded while at the same time the spatter is thrown up from the piercing hole h and becomes less easily removed by the side gas S.

Next, in the second process, the numerical controller 13 sends a command to the laser oscillation control circuit 14 to stop the irradiation with the laser beam L. The numerical controller 13 further maintains the side gas blow pressure and the machining head height at the first pressure value and the first height that are identical to the first process. Although irradiation with the laser beam L is not performed in the second process, the oxidation/combustion reaction occurred in the first process does not stop immediately; therefore, the oxidation reaction is interrupted by continuously jetting out the side gas S at high pressure, discharging the high-temperature spatter from the piercing hole h, and reducing the oxygen purity at the machining point. Moreover, in order to increase the efficiency of discharging the molten spatter, there needs to be ensured a sufficiently large clearance between the machining head 3 and the top surface of the workpiece W; therefore, the first height is maintained in the second process as well. The machining head height is maintained at the first height in the second process in order to be able to increase the efficiency of discharging the molten spatter. It is needless to say that the efficiency of discharging the molten spatter can be further increased by setting the machining head height in the second process at the first height or higher. Therefore, in the second process, the machining head 3 is controlled such that it is at an appropriate position for the efficiency of discharging the molten spatter to not be decreased by the machining head 3 getting too close to the workpiece W.

Moreover, the numerical controller 13 sends a command to the curvature variable optical component 2 and changes the beam diameter of the laser beam L to change the depth of focus to a second depth deeper than the first depth. The numerical controller 13 further sends a command to the lens driving motor 4a to move the lens 4 and change the focal position to a first in-focus position. The operation of changing each of the focal position and the depth of focus is performed to prepare for the third process and, in the second process in which the irradiation with the laser beam L is not performed, there is no effect caused by the change in each of the depth of focus and the focal position. The time after completion of the second process until the start of the third process can be reduced by changing, during the second process, the focal position from the defocus position to the first in-focus position and the depth of focus from the first depth to the second depth.

Next, in the third process, the numerical controller 13 sends a command to the laser oscillation control circuit 14 and causes the laser oscillator 1 to oscillate with the pulse wave of the first output value. It is difficult to discharge the spatter from the piercing hole h in the third process of machining the bottom of the piercing hole h formed in the first process; therefore, high laser output causes the machined workpiece W to absorb excessive heat, which results in self-burning. The pulse-wave laser beam L is oscillated from the laser oscillator 1 and set to have low average output and high peak output, thereby realizing piercing with high efficiency while preventing the workpiece W from absorbing excessive heat, which inhibits self-burning.

Moreover, in the third process, the numerical controller 13 sends a command to the servo control circuit 12 to move the machining head 3 and set the machining head height at a second height higher than the first height. The assist gas A at the bottom of the piercing hole h is thus supplied with high purity. The numerical controller 13 sends a command to the side gas feeder 8 to change the side gas blow pressure of the side gas S jetting out of the side gas nozzle 7 to a second pressure lower than the first pressure. As a result, the side gas nozzle 7 jets out the side gas S to the machining point with a second flow lower than the flow of the first process. The numerical controller 13 further maintains the focal position and the depth of focus at the first in-focus position and the second depth, respectively.

In the fourth process, the numerical controller 13 sends a command to the laser oscillation control circuit 14 and causes the laser oscillator 1 to oscillate with the pulse wave of the first output value. The numerical controller 13 sends a command to the curvature variable optical component 2 to change the depth of focus to a third depth deeper than the second depth. The numerical controller 13 further sends a command to the lens driving motor 4a to change the focal position to a second in-focus position. Moreover, the numerical controller 13 maintains the side gas blow pressure and the machining head height at the second pressure value and the second height that are identical to the third process.

Figure 5:
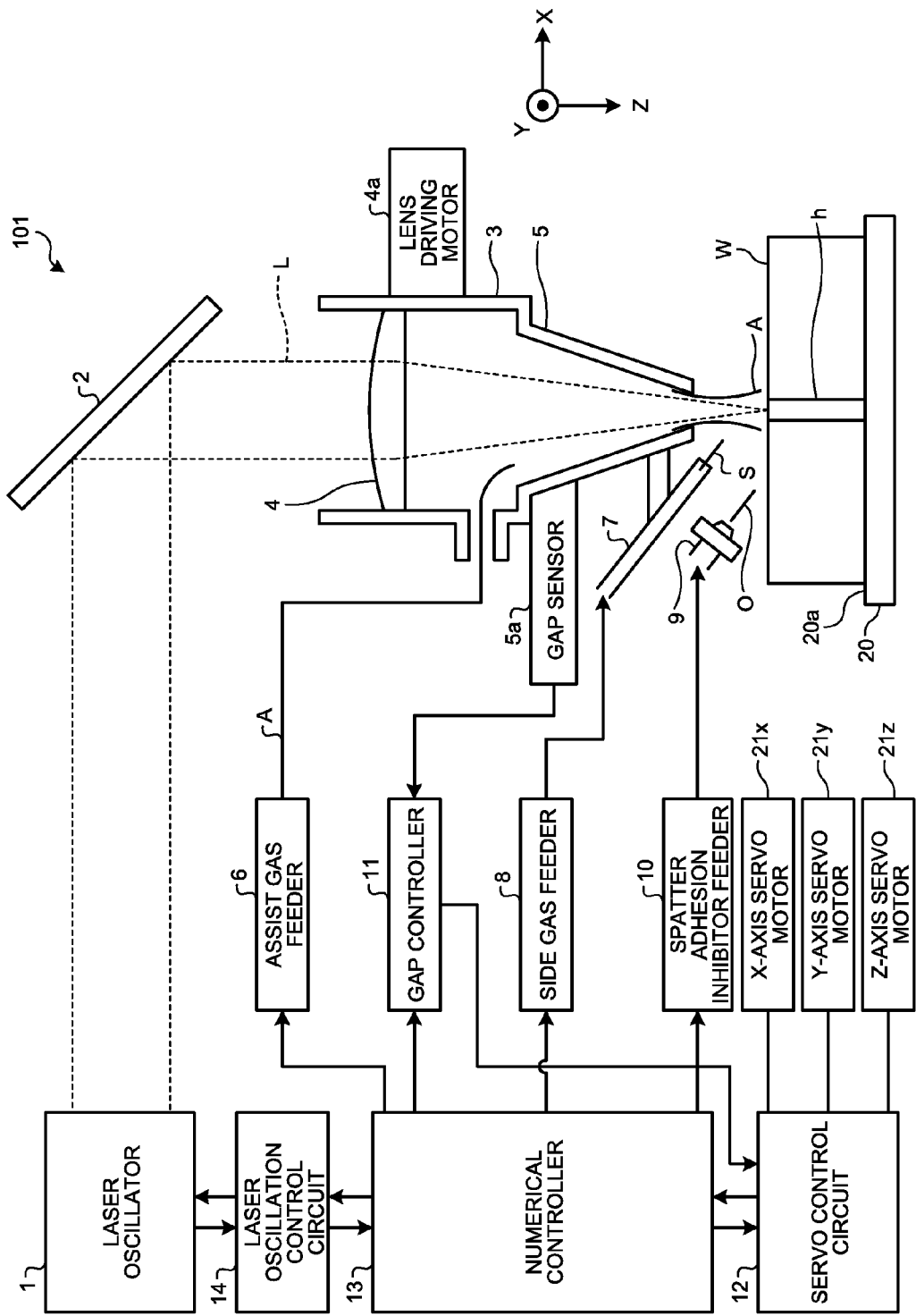
FIG. 5 is a diagram illustrating an example of a modified configuration of the laser machining apparatus according to the first embodiment.

FIG. 5 is a diagram illustrating an example of a modified configuration of the laser machining apparatus according to the first embodiment. A laser machining apparatus 101 according to the example of the modified configuration includes, in addition to the configuration illustrated in FIG. 1, a spatter adhesion inhibitor nozzle 9 that jets out a spatter adhesion inhibitor O to the machining point of the workpiece W and a spatter adhesion inhibitor feeder 10 that feeds the spatter adhesion inhibitor to the spatter adhesion inhibitor nozzle 9.

A command value from the numerical controller 13 causes the spatter adhesion inhibitor feeder 10 to feed the spatter adhesion inhibitor O to the spatter adhesion inhibitor nozzle 9. Here, the spatter adhesion inhibitor O contains an ingredient that is a surface lubricant or oil that prevents the spatter from adhering to the workpiece W. The spatter adhesion inhibitor O fed to the spatter adhesion inhibitor nozzle 9 jets out of the spatter adhesion inhibitor nozzle 9 to the vicinity of the piercing hole h on the workpiece W, and is used to prevent adhesion of the spatter around the piercing hole h.

The spatter adhesion inhibitor nozzle 9 is fixed independently of the machining head 3 in order for the spatter adhesion inhibitor O to not adhere to the nozzle 5. The machining head 3 is moved up to a retreat position when the spatter adhesion inhibitor O is jetted out.

With the configuration including the spatter adhesion inhibitor nozzle 9 and the spatter adhesion inhibitor feeder 10, upon completion of the second process, the spatter adhesion inhibitor O is fed to the machining point after the machining head 3 is moved up to the retreat position with the side gas blow suspended. Such an operation can inhibit adhesion of the spatter to the workpiece W.

Even though the example of performing the second piercing process in two processes has been described, the second piercing process may instead be performed in three or more processes. Note that although the output, the depth of focus, and the focal position of the laser beam L as well as the machining head height and the side gas blow pressure may be changed continuously during the second piercing process, they are more easily controlled when changed stepwise.

The laser machining apparatus 100 according to the first embodiment supplies the side gas blow to the machining point during the first piercing process and the second piercing process, whereby self-burning can be inhibited even when the laser output is increased to the output at which self-burning would occur without the side gas blow. The laser machining apparatus 100 according to the first embodiment performs piercing with the high-power laser beam L so as to be able to reduce the time required for piercing compared to when piercing is performed at the laser output that does not cause self-burning even without the side gas blow.

Moreover, during the second piercing process, the laser machining apparatus 100 according to the first embodiment changes the output of the laser beam L to the third output value, which is smaller than the first output value and larger than the second output value; changes the focal position to the second in-focus position, which has a larger in-focus amount than the first in-focus position; and changes the depth of focus to the third depth, which is deeper than the second depth from the state in which the output of the laser beam L is set at the second output value, which is smaller than the first output value; in which the focal position is set at the first in-focus position; in which the depth of focus is set at the second depth, which is deeper than the first depth; and in which the side gas blow pressure is set at the second pressure value, which is lower than the first pressure value. As a result, the laser machining apparatus 100 according to the first embodiment can increase the piercing efficiency and reduce the time required for the piercing of the piercing hole h.

Second Embodiment

Figure 6:
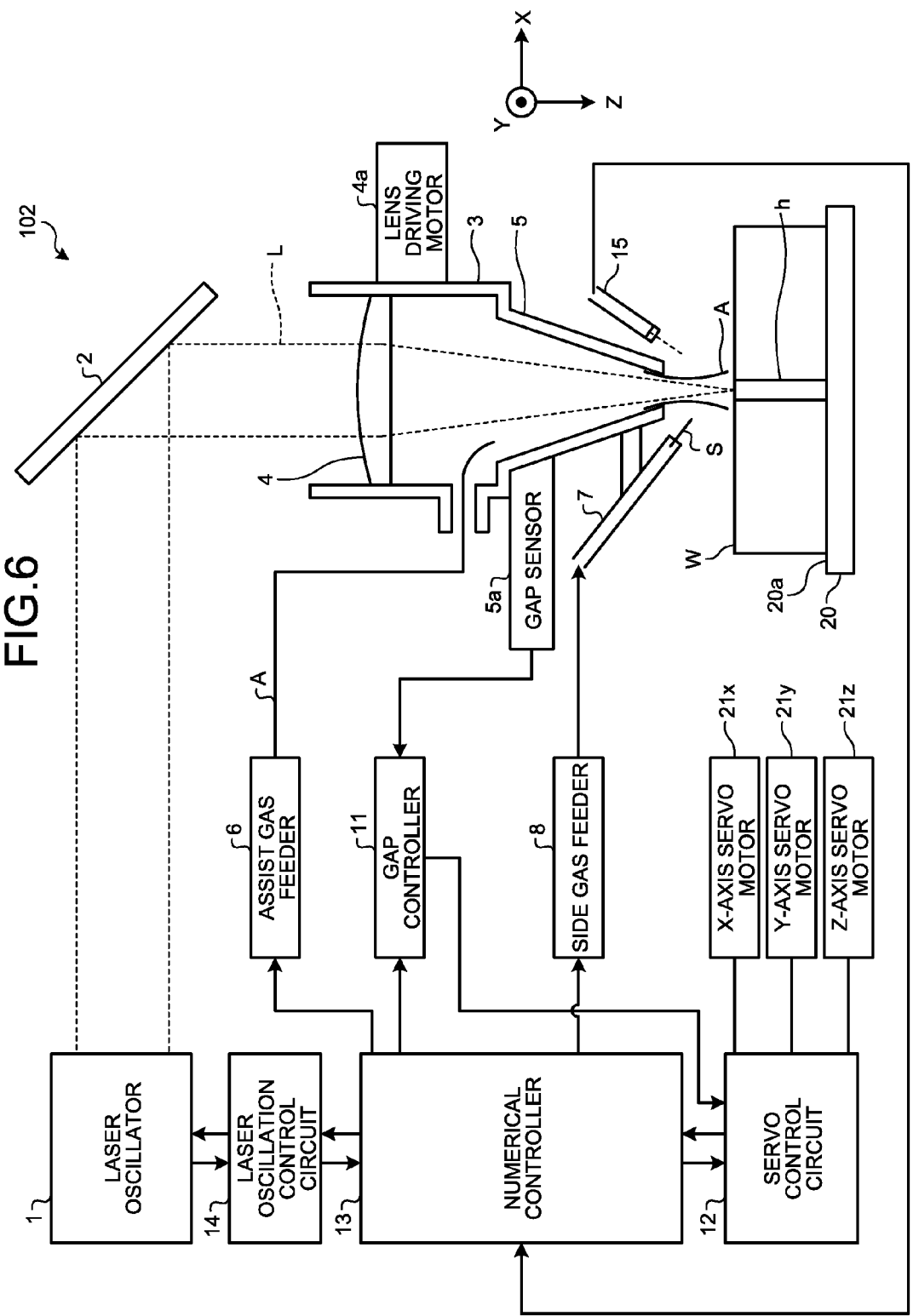
FIG. 6 is a device configuration diagram of a laser machining apparatus that implements a laser machining method according to a second embodiment of the present invention.

FIG. 6 is a device configuration diagram of a laser machining apparatus that implements a laser machining method according to a second embodiment of the present invention. A laser machining apparatus 102 according to the second embodiment is different from the laser machining apparatus 100 according to the first embodiment in that it further includes a temperature sensor 15. The temperature sensor 15 is a sensor measuring the temperature of the workpiece W around a machining point. The components included in the laser machining apparatus 102 according to the second embodiment are similar to those of the laser machining apparatus 100 according to the first embodiment except for the temperature sensor 15.

In the second embodiment, the numerical controller 13 stores a machining parameter adjustment function, which is a function that represents the relationship between the temperature of the workpiece W and the amount of adjustment for each component of the machining parameter, and calculates the amount of adjustment of the machining parameter by substituting the result of the measurement made by the temperature sensor 15 into the machining parameter adjustment function. With a value of the machining parameter at a reference temperature used as a reference value, the machining parameter adjustment function is a function that defines the adjustment amount as an increase or decrease with respect to the reference value of the machining parameter according to a temperature difference between the reference temperature and the temperature of the workpiece W. The machining parameter adjustment function is obtained on the basis of the result of actual piercing performed. The numerical controller 13 uses the machining parameter adjusted by using the machining parameter adjustment function to perform laser machining.

Figure 7:
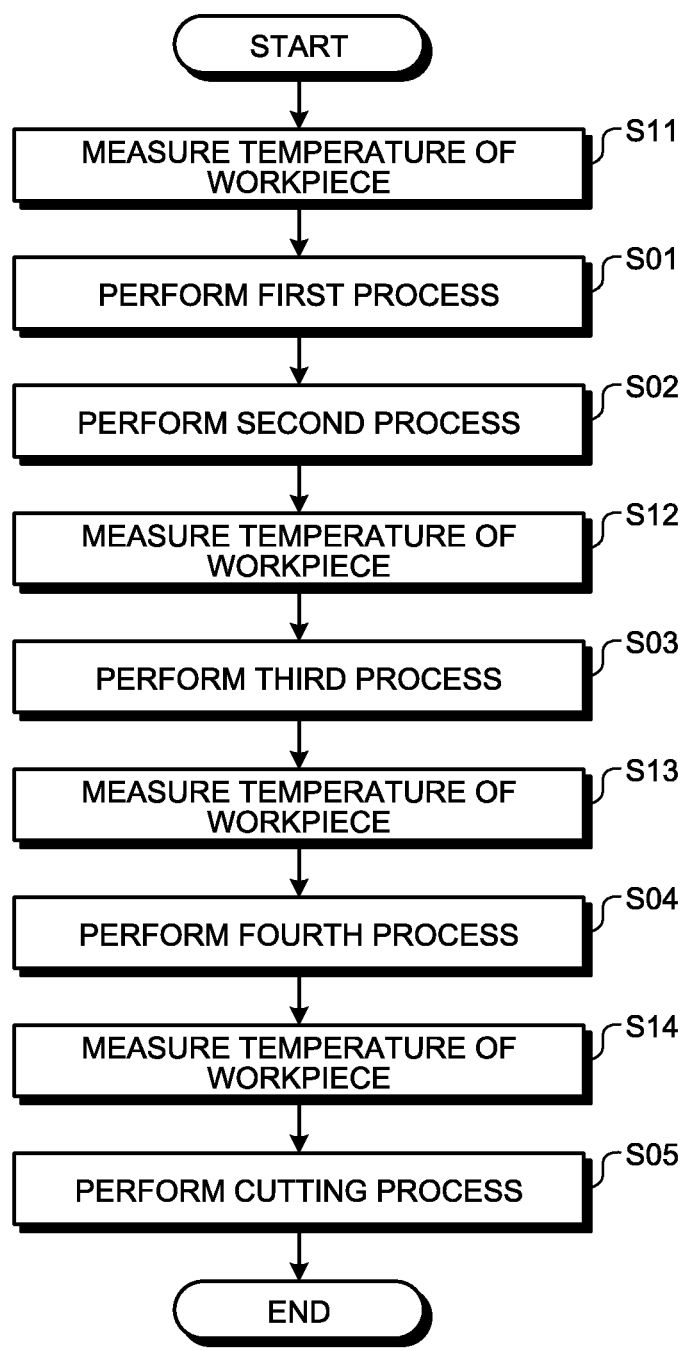
FIG. 7 is a flowchart illustrating the flow of an operation of the laser machining apparatus according to the second embodiment.

FIG. 7 is a flowchart illustrating the flow of a piercing operation performed by the laser machining apparatus according to the second embodiment. The temperature sensor 15 measures the temperature of the workpiece W prior to irradiation with a laser in a first piercing process, a second piercing process, and a cutting process. That is, the temperature sensor 15 measures the temperature of the workpiece W from step S11 to step S14 prior to a first process in step S01, a third process in step S03, a fourth process in step S04, and a cutting process in step S05. Then, in the first process in step S01, machining is performed with the machining parameter adjusted on the basis of the result of the measurement performed by the temperature sensor 15 in step S11. In the third process in step S03, machining is performed with the machining parameter adjusted on the basis of the result of the measurement performed by the temperature sensor 15 in step S12. In the fourth process in step S04, machining is performed with the machining parameter adjusted on the basis of the result of the measurement performed by the temperature sensor 15 in step S13. In the cutting process in step S05, laser machining is performed with the machining parameter adjusted on the basis of the result of the measurement performed by the temperature sensor 15 in step S14.

Note that the machining parameter adjustment function used in the first process in step S01, the third process in step S03, the fourth process in step S04, and the cutting process in step S05 may be identical or different.

The probability of the occurrence of self-burning varies depending on the individual difference in the composition of the workpiece W, the individual difference in the state of the surface oxide film on the workpiece W, and the state of residual heat in the workpiece W. In the second embodiment, the temperature of the workpiece W is measured by the temperature sensor 15 in order to adjust the machining parameter. Accordingly, the second embodiment is more effective at inhibiting the occurrence of self-burning and inhibiting the increase in the piercing time than the first embodiment. That is, the second embodiment is similar to the first embodiment in terms of the effect of preventing the occurrence of self-burning, but it can further reduce the piercing time compared to the first embodiment.

Third Embodiment

Figure 8:
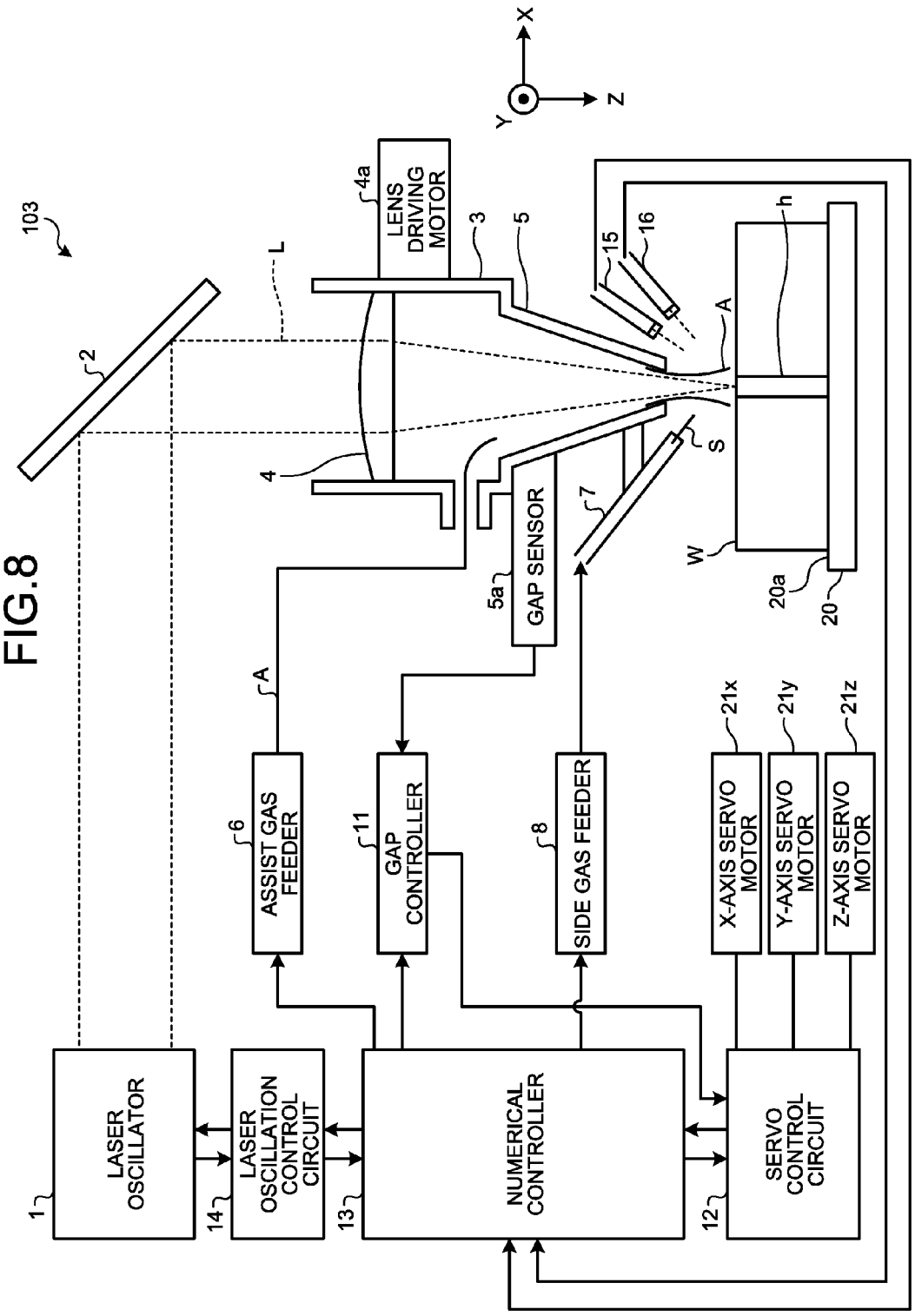
FIG. 8 is a device configuration diagram of a laser machining apparatus that implements a laser machining method according to a third embodiment of the present invention.

FIG. 8 is a device configuration diagram of a laser machining apparatus that implements a laser machining method according to a third embodiment of the present invention. A laser machining apparatus 103 according to the third embodiment is different from the second embodiment in that it further includes an optical sensor 16. The optical sensor 16 is a sensor that detects optical intensity of a machining point. The numerical controller 13 can detect the occurrence of self-burning and the time required for the piercing hole h to be pierced on the basis of the optical intensity detected by the optical sensor 16. The components included in the laser machining apparatus 103 according to the third embodiment are similar those of the laser machining apparatus 102 according to the second embodiment except for the optical sensor 16.

There is a tradeoff between the probability of the occurrence of self-burning and the time required for the piercing hole h to be pierced. Accordingly, the time required for the piercing hole h to be pierced is increased as a machining parameter is set to reduce the probability of the occurrence of self-burning, whereas the probability of the occurrence of self-burning is increased as the machining parameter is set to reduce the time required for the piercing hole h to be pierced.

In the third embodiment, the numerical controller 13 corrects the machining parameter adjustment function on the basis of the result detected by the optical sensor 16 in order to correct the machining parameter such that, in the event of self-burning, the probability of the occurrence of self-burning is reduced even though there is an increase in the piercing time, and also in order to correct the machining parameter such that, in the event that the piercing hole h is pierced without the occurrence of self-burning, the piercing hole h can be pierced in a shorter period of time. That is, the numerical controller 13 corrects the machining parameter adjustment function such that the machining parameter is changed to have a bias causing an increase in time in the event of self-burning, and corrects the machining parameter adjustment function such that the machining parameter is changed to have a bias causing a reduction in time in the event that the piercing hole h is pierced without the occurrence of self-burning.

Figure 9:
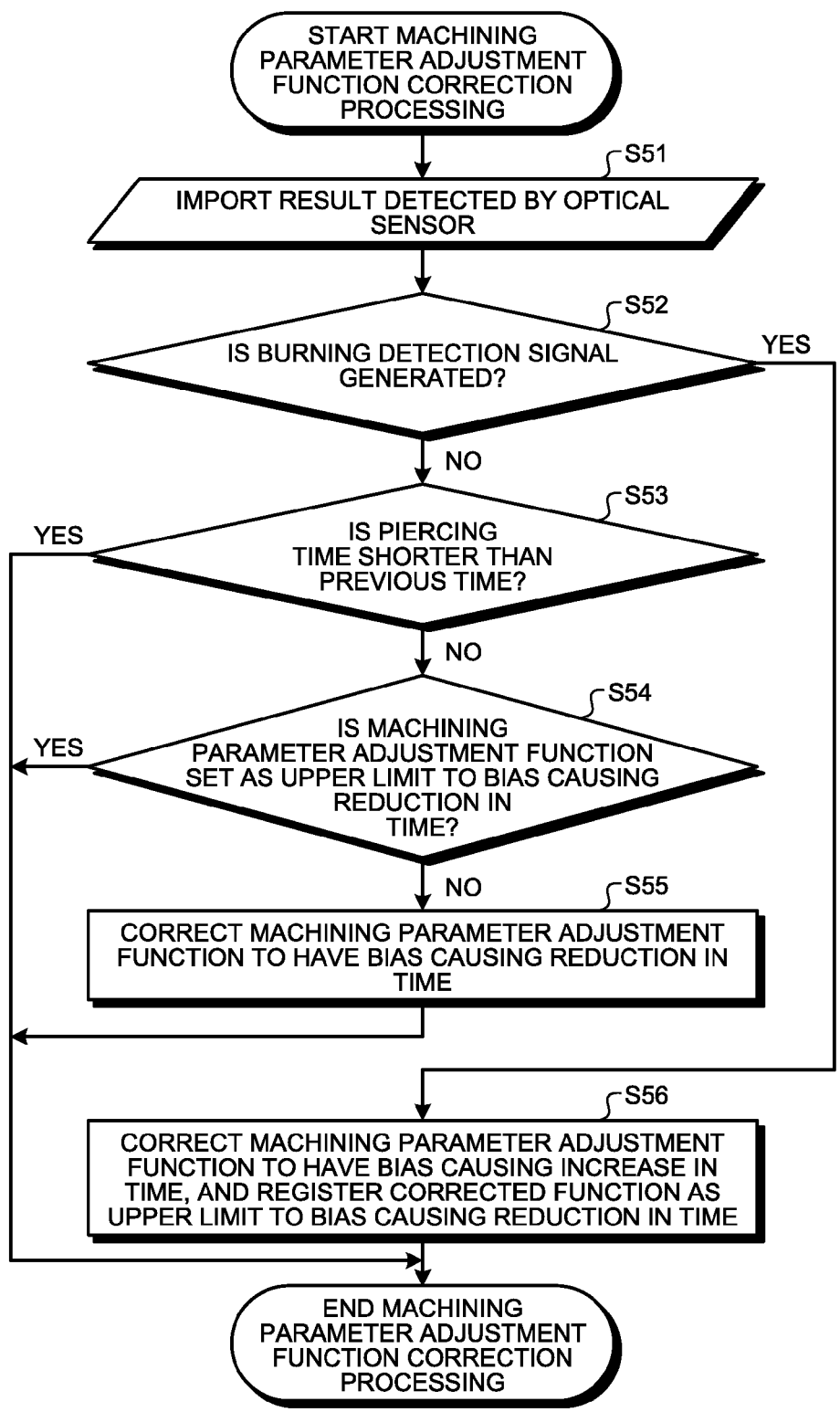
FIG. 9 is a flowchart illustrating the flow of a process that corrects a machining parameter adjustment function of the laser machining apparatus according to the third embodiment.

Specifically, the laser machining apparatus 103 according to the third embodiment corrects the machining parameter adjustment function on the basis of the occurrence of self-burning and the time required for the piercing hole h to be pierced that are detected by the optical sensor 16. FIG. 9 is a flowchart illustrating the flow of processing that corrects the machining parameter adjustment function of the laser machining apparatus according to the third embodiment. The machining parameter adjustment function is corrected by the numerical controller 13 every time piercing is performed.

In step S51, the numerical controller 13 imports the result of the measurement performed by the optical sensor 16. In step S52, the numerical controller 13 determines whether or not a burning detection signal is generated on the basis of the result of the measurement performed by the optical sensor 16. If there is a burning detection signal (step S52: Yes), the numerical controller 13 proceeds to step S56 and corrects the machining parameter adjustment function such that it has a bias causing an increase in time, registers the corrected function, and sets it as an upper limit to the bias causing a reduction in time. The numerical controller 13 completes processing after step S56.

If there is no burning detection signal (step S52: No), the numerical controller 13 proceeds to step S53 and determines whether or not the time required for the piercing hole h to be pierced is shorter than the piercing time in the previous piercing. The numerical controller 13 completes processing when the time required for the piercing hole h to be pierced is shorter than the piercing time in the previous piercing (step S53: Yes). When the time required for the piercing hole h to be pierced is longer than or equal to the piercing time in the previous piercing (step S53: No), the numerical controller 13 proceeds to step S54 and determines whether or not a current machining parameter adjustment function is set as the upper limit to the bias causing a reduction in time. The numerical controller 13 completes processing when the current machining parameter adjustment function is set as the upper limit to the bias causing a reduction in time (step S54: Yes). When the current machining parameter adjustment function is not set as the upper limit to the bias causing a reduction in time (step S54: No), the numerical controller 13 proceeds to step S55 and corrects the machining parameter adjustment function such that it has the bias causing a reduction in time. The numerical controller 13 completes processing after step S55.

The machining parameter adjustment function is desirably obtained for each material specification but it is obtained on the basis of the result of the actual piercing as described above. The problem is that an effort is required to obtain the machining parameter adjustment function for all the material specifications that could possibly be subjected to machining and to store them in the numerical controller 13. The laser machining apparatus 103 according to the third embodiment causes the optical sensor 16 to detect the occurrence of self-burning and the time required for the piercing hole h to be pierced and corrects the machining parameter adjustment function on the basis of the result detected by the optical sensor 16. As a result, the laser machining apparatus 103 according to the third embodiment can use the machining parameter adjustment function of a representative material specification when adjusting the machining parameter of a material having a similar specification; therefore, the laser machining apparatus 103 can reduce the effort of generating the machining parameter adjustment function and storing it in the numerical controller 13.

Moreover, even during the machining of a material with the same specifications, the laser machining apparatus 103 according to the third embodiment can inhibit an increase in the probability of the occurrence of self-burning due to the individual difference in a material composition, the individual difference in a state of a surface oxide film, and a change in the state of residual heat in the workpiece W.

Fourth Embodiment

Figure 10:
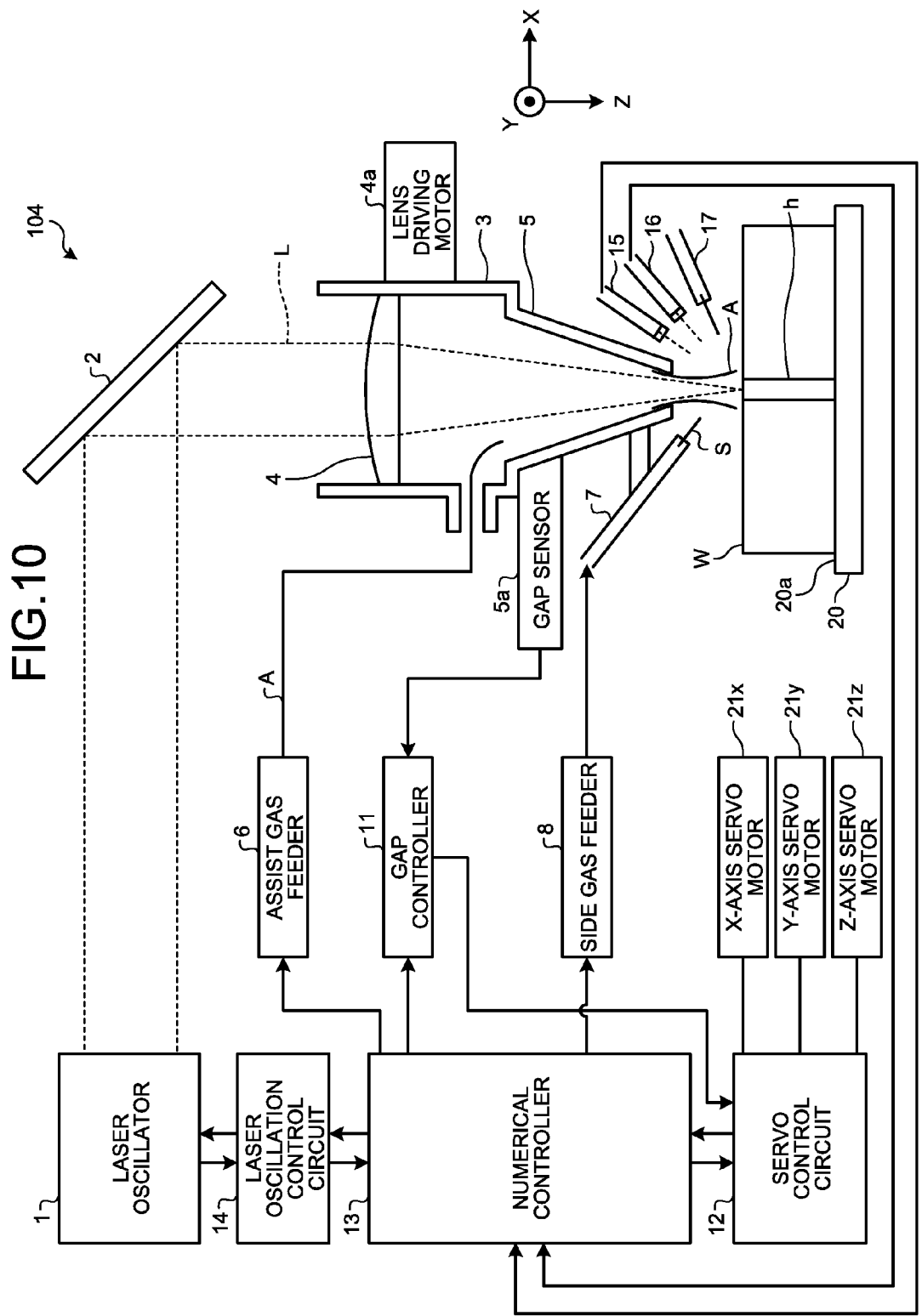
FIG. 10 is a device configuration diagram of a laser machining apparatus that implements a laser machining method according to a fourth embodiment of the present invention.

FIG. 10 is a device configuration diagram of a laser machining apparatus that implements a laser machining method according to a fourth embodiment of the present invention. A laser machining apparatus 104 according to the fourth embodiment is different from the third embodiment in that it further includes a cooling fluid jet nozzle 17. The cooling fluid jet nozzle 17 is a nozzle jetting out cooling fluid toward the vicinity of a machining point on the workpiece W. The cooling fluid can, for example, be water. The components included in the laser machining apparatus 104 according to the fourth embodiment are similar to those of the third embodiment except for the cooling fluid jet nozzle 17.

Figure 11:
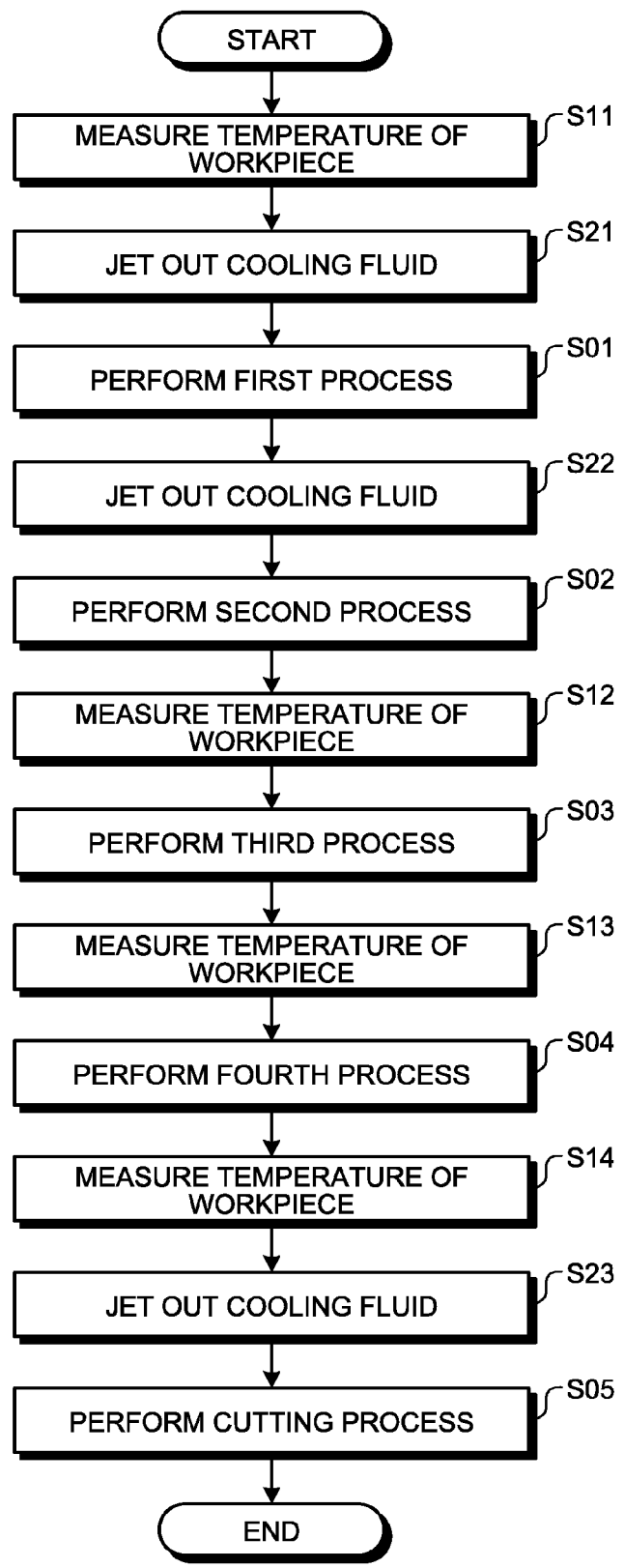
FIG. 11 is a flowchart illustrating the flow of an operation of the laser machining apparatus according to the fourth embodiment.

FIG. 11 is a flowchart illustrating the flow of an operation of the laser machining apparatus according to the fourth embodiment. The cooling fluid jet nozzle 17 jets out the cooling fluid against the workpiece W immediately before each of a first piercing process, a cooling process, and a cutting process. That is, the cooling fluid jet nozzle 17 jets out the cooling fluid against the workpiece W in steps S21, S22, and S23 immediately before a first process in step S01, a second process in step S02, and the cutting process in step S05, respectively.

The temperature of the workpiece W decreases by jetting the cooling fluid against the workpiece W in steps S21, S22, and S23. Therefore, as compared to a case where the cooling fluid is not jetted out, the probability of the occurrence of self-burning is reduced so as to be able to stabilize the machining.

The configurations illustrated in the aforementioned embodiments merely illustrate examples of the content of the preset invention, and can thus be combined with another known technique or partially omitted and/or modified without departing from the gist of the present invention.

REFERENCE SIGNS LIST 1 laser oscillator, 2 curvature variable optical component, 3 machining head, 4 lens, 4a lens driving motor, 5 nozzle, 5a gap sensor, 6 assist gas feeder, 7 side gas nozzle, 8 side gas feeder, 9 spatter adhesion inhibitor nozzle, 10 spatter adhesion inhibitor feeder, 11 gap controller, 12 servo control circuit, 13 numerical controller, 14 laser oscillation control circuit, 15 temperature sensor, 16 optical sensor, 17 cooling fluid jet nozzle, 20 machining table, 20a mount surface, 21x X-axis servo motor, 21y Y-axis servo motor, 21z Z-axis servo motor, 100, 101, 102, 103, 104 laser machining apparatus.

The invention claimed is:

1. A laser machining method of forming a piercing hole by irradiating a workpiece with a laser beam and cutting the workpiece starting from the piercing hole, which is a machining start point, the method comprising:

a first piercing process of forming the piercing hole that is a non-through hole extending from a top surface to a central portion of the workpiece;

a cooling process of cooling the workpiece;

a second piercing process of making the piercing hole pierce through to a bottom surface of the workpiece; and a cutting process of cutting the workpiece, wherein the first piercing process includes performing piercing by irradiating the workpiece with the laser beam while setting an output of the laser beam at a first output value, setting a focal position of the laser beam at a defocus position, setting a depth of focus of the laser beam at a first depth, and setting a side gas blow pressure, which is a pressure of a side gas fed to a machining point, at a first pressure value, and the second piercing process includes performing piercing by irradiating the workpiece with the laser beam while changing the output of the laser beam to a third output value, which is smaller than the first output value and larger than a second output value, changing the focal position to a second in-focus position, which has a larger in-focus amount than a first in-focus position, and changing the depth of focus to a third depth, which is deeper than a second depth, from a state in which the output of the laser beam is set at the second output value, which is smaller than the first output value, in which the focal position is set at the first in-focus position, in which the depth of focus is set at the second depth, which is deeper than the first depth, and in which the side gas blow pressure is set at a second pressure value, which is lower than the first pressure value.

2. The laser machining method according to claim 1, wherein the first piercing process includes setting a machining head height at a first height, the machining head height being a height of a machining head irradiating the workpiece with the laser beam from the workpiece, the cooling process includes maintaining the machining head height at the first height, and the second piercing process includes setting the machining head height at a second height, which is lower than the first height.

3. The laser machining method according to claim 2, wherein, during the cooling process, the focal position is changed from the defocus position to the first in-focus position and the depth of focus is changed from the first depth to the second depth.

4. The laser machining method according to claim 1, wherein the second piercing process includes changing the output, the focal position, and the depth of focus of the laser beam stepwise.

5. The laser machining method according to claim 1, further comprising:

measuring a temperature of the workpiece prior to each of the first piercing process, the second piercing process, and the cutting process and adjusting, on a basis of a measured temperature of the workpiece, the output, the focal position, and the depth of focus of the laser beam, and the side gas blow pressure during the first piercing process, the second piercing process, and the cutting process with a machining parameter adjustment function so as to perform machining.

6. The laser machining method according to claim 5, further comprising:

detecting an occurrence of self-burning during the first piercing process and the second piercing process and a piercing time required for the piercing hole to be pierced from a start of machining;

correcting the machining parameter adjustment function so as to have a bias causing an increase in time when an occurrence of the self-burning is detected; and correcting the machining parameter adjustment function so as to have a bias causing a reduction in time when an occurrence of the self-burning is not detected and the piercing time is longer than a previous time.

7. The laser machining method according to claim 5, further comprising jetting cooling fluid against the workpiece prior to each of the first piercing process, the second piercing process, and the cutting process.

8. A laser machining apparatus that forms a piercing hole by irradiating a workpiece with a laser beam and cuts the workpiece starting from the piercing hole, which is a machining start point, the apparatus comprising:

a laser oscillator to oscillate the laser beam;

a curvature variable optical component to change a depth of focus of the laser beam;

a machining head to be able to have a varied machining head height, which is a height from the workpiece, and to irradiate the workpiece with the laser beam;

a lens to change a focal position of the laser beam emitted from the curvature variable optical component independently of the machining head height, the lens being provided inside the machining head;

a side gas feeder to be able to change a side gas blow pressure, which is a pressure of a side gas jetting out to a machining point on the workpiece; and a controller to control an output, the depth of focus, and the focal position of the laser beam, the machining head height, and the side gas blow pressure, wherein the controller performs:

a first piercing process of forming the piercing hole that is a non-through hole extending from a top surface to a central portion of the workpiece by performing piercing by irradiating the workpiece with the laser beam while setting the output of the laser beam at a first output value, setting the focal position at a defocus position, setting the depth of focus at a first depth, and setting the side gas blow pressure at a first pressure value;
and a second piercing process of making the piercing hole pierce through to a bottom surface of the workpiece by performing piercing while changing the output of the laser beam to a third output value, which is smaller than the first output value and larger than a second output value, changing the focal position to a second in-focus position, which has a larger in-focus amount than a first in-focus position, and changing the depth of focus to a third depth, which is deeper than a second depth, from a state in which the output of the laser beam is set at the second output value, which is smaller than the first output value, in which the focal position is set at the first in-focus position, in which the depth of focus is set at the second depth, which is deeper than the first depth, and in which the side gas blow pressure is set at a second pressure value, which is lower than the first pressure value.

9. The laser machining apparatus according to claim 8, further comprising a temperature sensor to measure a temperature of the workpiece, wherein the controller uses the temperature sensor to measure a temperature of the workpiece prior to the first piercing process, the second piercing process, and a cutting process of performing the cutting and adjusts, on a basis of a measured temperature of the workpiece, the output, the focal position, and the depth of focus of the laser beam, and the side gas blow pressure during the first piercing process, the second piercing process, and the cutting process with a machining parameter adjustment function so as to perform laser machining.

10. The laser machining apparatus according to claim 9, further comprising an optical sensor to detect an occurrence of self-burning during the first piercing process and the second piercing process and a piercing time required for the piercing hole to be pierced from a start of machining, wherein the controller corrects the machining parameter adjustment function so as to have a bias causing an increase in time when an occurrence of the self-burning is detected, and corrects the machining parameter adjustment function so as to have a bias causing a reduction in time when an occurrence of the self-burning is not detected and the piercing time is longer than a previous time.

11. The laser machining apparatus according to claim 9, further comprising a unit to jet cooling fluid against the workpiece, wherein the controller jets the cooling fluid against the workpiece prior to the first piercing process, the second piercing process, and the cutting process.

* * * * *